US012559087B2

(12) United States Patent
Geese et al.

(10) Patent No.: US 12,559,087 B2
(45) Date of Patent: Feb. 24, 2026

(54) POWER SPLIT HYBRID TRANSMISSION HAVING SYNCHRONIZED DISCONNECT SHIFT ELEMENT

(71) Applicant: FCA US LLC, Auburn Hills, MI (US)

(72) Inventors: Jann H Geese, Warendorf (DE); Xin Diao, Pleasant Ridge, MI (US); Nadirsh Patel, Farmington Hills, MI (US); Daniel Berger, Simmerath (DE); Zachary L Tuller, Grand Rapids, MI (US)

(73) Assignee: FCA US LLC, Auburn Hills, MI (US)

( * ) Notice: Subject to any disclaimer, the term of this patent is extended or adjusted under 35 U.S.C. 154(b) by 240 days.

(21) Appl. No.: 18/362,269

(22) Filed: Jul. 31, 2023

(65) Prior Publication Data

US 2025/0042389 A1 Feb. 6, 2025

(51) Int. Cl.
*B60W 20/30* (2016.01)
*B60W 10/06* (2006.01)
(Continued)

(52) U.S. Cl.
CPC ............ *B60W 20/30* (2013.01); *B60W 10/06* (2013.01); *B60W 10/08* (2013.01);
(Continued)

(58) Field of Classification Search
CPC ...... B60W 20/30; B60W 10/06; B60W 10/08; B60W 10/115; B60W 2710/0644; B60W 2710/083; B60W 2710/1038; Y02T 10/62
See application file for complete search history.

(56) References Cited

U.S. PATENT DOCUMENTS 5,818,116 A * 10/1998 Nakae .................... B60K 6/445
903/903
5,909,720 A * 6/1999 Yamaoka ................ B60L 15/20
903/910

(Continued)

FOREIGN PATENT DOCUMENTS

CN 101501366 A * 8/2009 ............. B60K 6/365
DE 102007056723 A1 * 12/2008 ............ B60W 20/15
(Continued)

OTHER PUBLICATIONS

CN-101501366-A translation (Year: 2009).*
(Continued)

*Primary Examiner* — Kyle T Johnson
(74) *Attorney, Agent, or Firm* — Jeremy J. Klobucar

(57) ABSTRACT

A power split hybrid transmission for a vehicle includes an internal combustion engine (ICE), a first electric motor, a second electric motor, a disconnect element and a controller. The ICE drives an output shaft that is rotatably coupled to a planetary carrier of a planetary gear set. The first electric motor is rotatably coupled to a sun gear of the planetary gear set and provides a first rotatable input to a transmission output shaft. The second electric motor is rotatably coupled to a counter gear that provides a second rotatable input to the transmission output shaft. The disconnect element selectively disconnects rotatable motion from the transmission output shaft to drive wheels. The controller determines whether the ICE, the first electric motor and the second electric motor are disconnected from the drive wheels and commands torque to the first and second electric motors to cooperatively rotate the transmission output shaft.

12 Claims, 4 Drawing Sheets

(51) Int. Cl.
B60W 10/08 (2006.01)
B60W 10/115 (2012.01)
(52) U.S. Cl.
CPC ... B60W 10/115 (2013.01); B60W 2710/0644 (2013.01); B60W 2710/083 (2013.01); B60W 2710/1038 (2013.01)

(56) References Cited

U.S. PATENT DOCUMENTS

| | | | | |
|---|---|---|---|---|
| 7,234,553 B2 * | 6/2007 | Shimizu | ................. | B60W 10/08 |
| | | | | 180/245 |
| 7,677,341 B2 * | 3/2010 | Tomo | ..................... | B60L 58/12 |
| | | | | 180/65.265 |
| 7,983,833 B2 * | 7/2011 | Sugai | ................... | B60W 10/08 |
| | | | | 701/112 |
| 8,532,858 B1 * | 9/2013 | Robinette | ............ | B60W 20/20 |
| | | | | 701/99 |
| 8,535,201 B2 * | 9/2013 | Kuang | ................... | B60K 6/445 |
| | | | | 477/3 |
| 12,000,478 B1 * | 6/2024 | Thompson, IV | ... | F16H 61/0403 |
| 2001/0029221 A1 * | 10/2001 | Oliveira | ................ | B60W 10/02 |
| | | | | 477/110 |
| 2003/0085062 A1 * | 5/2003 | Bowen | ..................... | B60K 6/54 |
| | | | | 903/910 |
| 2003/0148843 A1 * | 8/2003 | Bowen | ................... | B60K 6/365 |
| | | | | 903/952 |
| 2007/0034427 A1 * | 2/2007 | Janson | ..................... | B60K 6/48 |
| | | | | 903/902 |
| 2009/0017984 A1 * | 1/2009 | Shibata | ................. | B60W 10/06 |
| | | | | 477/3 |
| 2009/0069966 A1 * | 3/2009 | Tabata | ................... | F16H 3/728 |
| | | | | 477/3 |
| 2009/0120707 A1 * | 5/2009 | Yoneda | .............. | B60T 8/17555 |
| | | | | 180/248 |
| 2010/0032217 A1 * | 2/2010 | Katsuta | ................. | B60K 6/445 |
| | | | | 477/3 |
| 2010/0084207 A1 * | 4/2010 | Wyall | ................... | B60W 20/13 |
| | | | | 180/65.21 |
| 2010/0173746 A1 * | 7/2010 | Ideshio | ................. | B60W 10/11 |
| | | | | 477/36 |
| 2011/0320075 A1 * | 12/2011 | Kim | ..................... | B60W 30/192 |
| | | | | 180/65.265 |
| 2012/0072065 A1 * | 3/2012 | Minamikawa | ......... | B60K 6/547 |
| | | | | 903/903 |
| 2013/0080038 A1 * | 3/2013 | Zhou | ..................... | B60W 20/00 |
| | | | | 701/113 |
| 2013/0210567 A1 * | 8/2013 | Puiu | ......................... | B60K 6/48 |
| | | | | 475/5 |
| 2013/0297133 A1 * | 11/2013 | Hasegawa | ................ | B60L 7/14 |
| | | | | 903/903 |
| 2014/0088807 A1 * | 3/2014 | Saito | ................. | B60W 30/1882 |
| | | | | 180/65.265 |
| 2014/0309079 A1 * | 10/2014 | Tabata | ................ | B60W 30/194 |
| | | | | 477/5 |
| 2015/0057866 A1 * | 2/2015 | Tseng | ................... | B60W 30/19 |
| | | | | 701/22 |
| 2016/0325732 A1 * | 11/2016 | Yang | ..................... | B60K 6/442 |
| 2019/0291716 A1 * | 9/2019 | Kasahara | ............. | B60W 10/02 |
| 2020/0158039 A1 * | 5/2020 | Aoki | ..................... | B60W 20/00 |
| 2021/0199179 A1 * | 7/2021 | Xie | ....................... | B60K 6/442 |
| 2025/0042389 A1 * | 2/2025 | Geese | ................... | B60W 10/06 |
| 2025/0222785 A1 * | 7/2025 | Devaraj | .............. | B60K 7/0007 |

FOREIGN PATENT DOCUMENTS

| | | | | |
|---|---|---|---|---|
| DE | 102009035780 A1 * | 2/2011 | ........ | B60W 30/1882 |
| JP | 2021031025 A * | 3/2021 | | |

OTHER PUBLICATIONS

JP-2021031025-A translation (Year: 2021).*
DE-102009035780-A1 translation (Year: 2011).*
DE-102007056723-A1 translation (Year: 2008).*

* cited by examiner

POWER SPLIT HYBRID TRANSMISSION HAVING SYNCHRONIZED DISCONNECT SHIFT ELEMENT

FIELD

The present application generally relates to a vehicle incorporating a power split hybrid transmission having a synchronized disconnect shift element.

BACKGROUND

Power split hybrid transmissions receive input torque from an internal combustion engine and at least one electric motor. The power split transmissions manage the input torque and deliver it to drive wheels of the vehicle. Current powertrain controls for power split hybrid transmissions utilize a method of shifting powertrain disconnect devices, such as a transfer case gearbox, that can be unsynchronous. As such, many times a shift (such as between a four-wheel drive high and low gear), can be perceived as rough by the driver of the vehicle. In some instances, such as when the vehicle is at a standstill, splines of a low range gear can be blocked from engagement into another gear. In other examples, it is not possible to do synchronized shifts for low range gear boxes while the vehicle is moving. Accordingly, while such power split hybrid transmissions work well for their intended purpose, there exists an opportunity for improvement in the relevant art.

SUMMARY

According to one example aspect of the invention, a power split hybrid transmission for a vehicle includes an internal combustion engine (ICE), a first electric motor, a second electric motor, a disconnect element and a controller. The ICE drives an output shaft that is rotatably coupled to a planetary carrier of a planetary gear set. The first electric motor is rotatably coupled to a sun gear of the planetary gear set and provides a first rotatable input to a transmission output shaft. The second electric motor is rotatably coupled to a counter gear that provides a second rotatable input to the transmission output shaft. The disconnect element selectively disconnects rotatable motion from the transmission output shaft to drive wheels. The controller determines whether the ICE, the first electric motor and the second electric motor are disconnected from the drive wheels and commands torque to the first and second electric motors to cooperatively rotate the transmission output shaft.

In some implementations, the controller receives a target engine speed signal and an actual engine speed signal for the ICE and outputs a first engine speed control torque command signal for the first electric motor and a second engine speed control torque command signal for the second electric motors.

In some implementations, the controller receives a transmission output target speed signal and an actual transmission output speed signal for the transmission output shaft and outputs a first transmission control torque command signal for the first electric motor and a second transmission control torque command signal for the second electric motor.

According to another example aspect of the invention, the controller outputs a final first torque command signal to the first electric motor based on the first engine speed control torque command signal and the first transmission output speed signal In some implementations, the controller outputs a final second torque command signal to the second electric motor based on the second engine speed control torque command signal and the second transmission output speed signal.

In some implementations, the disconnect element further comprises a disconnect clutch. The disconnect clutch is positioned between the transmission output shaft and a transfer case input shaft of a transfer case. The transfer case is a two speed transfer case providing a high and low 4WD gear ratio. The first and second electric motors are charged by a high voltage battery system.

According to another example aspect of the invention, a method of controlling a power split hybrid transmission for a vehicle is provided. The power split hybrid transmission includes an internal combustion engine (ICE), a first electric motor and a second electric motor that provide rotatable torque inputs to a transmission output shaft. A disconnect element selectively disconnects rotatable motion from the transmission output shaft to drive wheels of the vehicle. The method includes receiving a target speed signal and an actual engine speed signal for the ICE. A first engine speed control torque command signal for the first electric motor and a second engine speed control torque command signal for the second electric motor are output based on the target engine speed signal and the actual engine speed signal. A transmission output target speed signal and an actual transmission output speed signal for the transmission output shaft are received. A first transmission control torque command signal for the first electric motor and a second transmission control torque command signal for the second electric motor are output based on the transmission output target speed signal and the actual transmission output speed signal. A first final torque is commanded to the first electric motor based on the first engine speed control torque command signal and the first transmission output speed signal. A second final torque is commanded to the second electric motor based on the second engine speed control torque command signal and the second transmission output speed signal.

In other implementations, control determines whether the ICE, the first electric motor and the second electric motor are disconnected from the drive wheels. Control commands the final torques to the first and second electric motors based on the determination. The final second torque to the second electric motor is further based on wheel speeds of the drive wheels.

In some implementations, the final second torque to the second electric motor is further based on a ratio between a rotation of the second electric motor and a rotation of the transmission output shaft.

According to another example aspect of the invention, control determines whether an input speed of the second electric motor has altered a speed of the ICE. Control commands an input torque of the first electric motor to counteract the input speed of the second motor to maintain a desired speed of the ICE.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, in a conventional power split hybrid transmission a controller utilizes a method of unsynchronous shifting of a powertrain disconnect device such as a transfercase gearbox. In this configuration, the output speed of the transmission is left in an uncontrolled state. In doing so, a driveline shift (such as between 4WD Low and 4WD High), depending on the differential speed at which the shift is executed, can result in a rough or bumpy shift felt by the vehicle operator. State of the art powertrain controls typically control transmission output torque to a controlled zero state, rather than controlling the transmission output shaft speed when the powertrain is open in a power split hybrid transmission. In a vehicle at standstill, utilizing existing solutions, the splines of a low range gear box can be blocked and an engagement into a different gear is not possible. Further, it is also not possible to do synchronized shifts for low range gear boxes while the vehicle is moving. Contrary to conventional gearboxes with a torque converter, there will not be some small residual torque transferred via the oil in the gearbox even in neutral that will rotate the entry side of a low range gear box. That movement, in a conventional gearbox having a torque convertor, would be sufficient to enable engagement of the clutches in the gearbox. These unsynchronized shifts can limit the maximum vehicle speed at which a change of gear is possible and is still perceivable to the vehicle driver.

Prior art control methods are capable of controlling the speed of the internal combustion engine and maintain the high voltage battery state of charge without affecting the wheel torque. Such methods rely on the powertrain being connected to the wheels. Such systems cannot handle a second degree of freedom for the speed in the powertrain. If the powertrain is disconnected from the wheels, a second component besides the engine speed, the transmission output shaft, needs to be controlled.

The present disclosure provides a controller and related algorithm that reacts when the power split hybrid powertrain is in an open state (disconnected from the drive wheels), where the sources of drive torque (internal combustion engine and electric motors) are not connected to the wheels any more. The controller and related method controls the speed of the transmission output shaft safely to provide a smooth shift without generating torque on the drive wheels.

Figure 1:
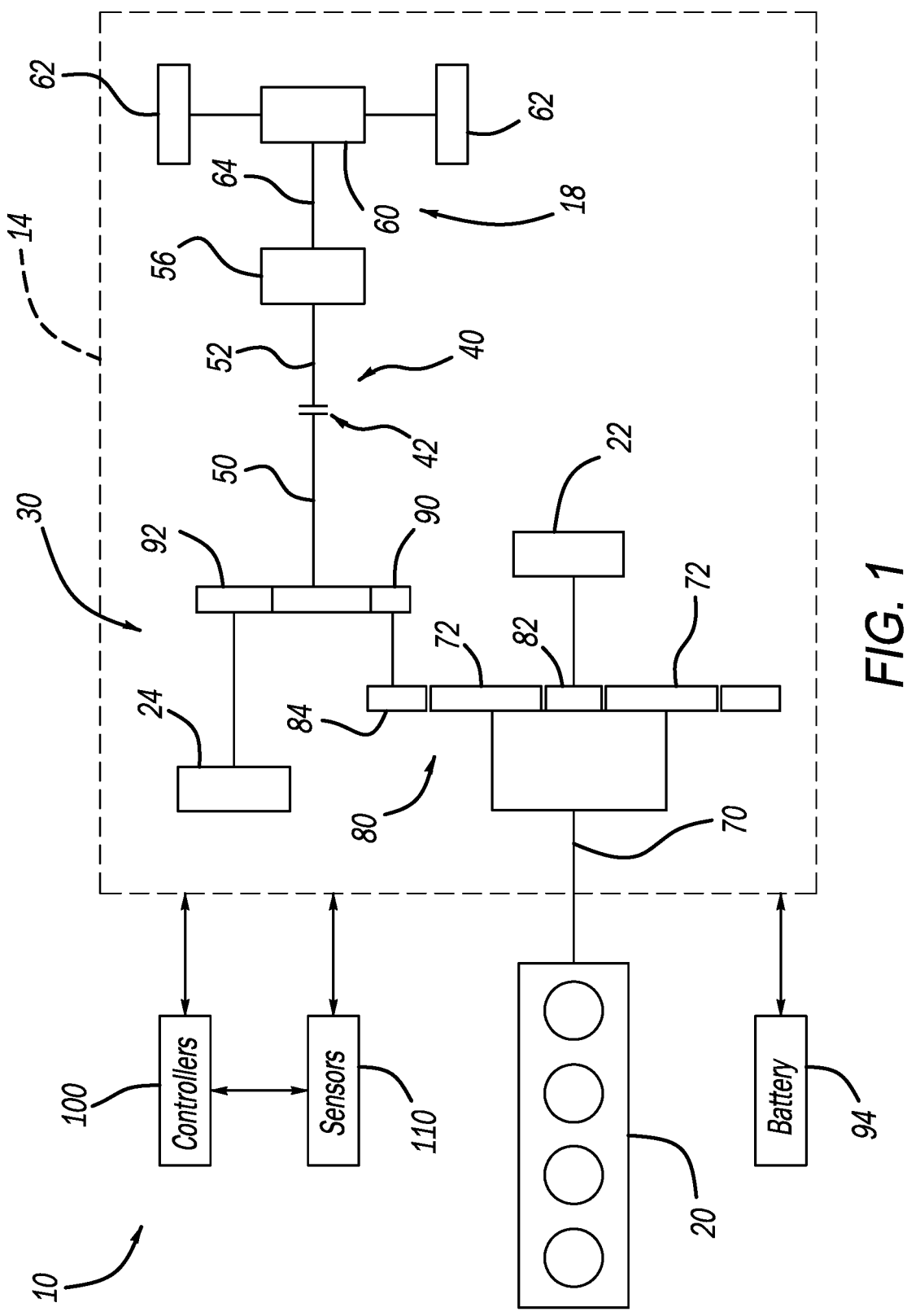
FIG. 1 is a functional block diagram of a vehicle incorporating a power split hybrid transmission having a synchronized shift disconnect element according to the principles of the present application.

With initial reference to FIG. 1, a functional block diagram of an example vehicle 10 according to the principles of the present application is illustrated. The vehicle 10 includes a powertrain 14 having a power split hybrid transmission 30 configured to generate and transfer drive torque to a driveline 18 of the vehicle 10 for propulsion. The powertrain 14 generally comprises an internal combustion engine (ICE) 20, a first electric motor 22, and a second electric motor 24. As will be described herein, the power split hybrid transmission 30 further incorporates a disconnect element 40. The disconnect element 40 includes a disconnect clutch 42 positioned between a transmission output shaft 50 and a transfer case input shaft 52 of a transfer case 56. The transfer case 56 in the present example is a two speed transfer case that provides a high and a low 4WD gear ratio at a transfer case output shaft 60. The driveline 18 further includes a differential 60 that receives a rotatable input from the transfer case output shaft 64 and delivers a drive torque to drive wheels 62.

The ICE 20 drives an output shaft 70 that is rotatably coupled to planetary carrier 72 (having planet gears, not shown) of a planetary gear set 80. The planetary gear set 80 further includes a sun gear 82 and a ring gear 84. The sun gear 82 is rotatably fixed to the first electric motor 22. The ring gear 84 is rotatably coupled to a first ratio counter gear 90. A second ratio counter gear 92 is rotatably coupled to the second electric motor 24. The transmission output shaft 50 rotates based on rotatable inputs from the first and second ratio counter gears 90 and 92. The first and second electric motors 22 and 24 are powered by a high voltage battery system 94. The high voltage battery system 94 can be charged during use of the vehicle such as by voltage generation from the powertrain 14 including the ICE 20 and any regenerative braking inputs.

In the power split hybrid transmission 30, the first electric motor 22 is connected to the sun gear 82 of the planetary gear set 80 and used to control the speed of the ICE 20 at the planet carrier 72. Due to the physics of the power split hybrid transmission 30, the second electric motor 24 counter acts the torque created by the first electric motor 22 to achieve a net zero torque at the transmission output shaft 50. As will become appreciated therein, a controller 100 communicates with the powertrain 14 to command the second motor 14 to control the speed of the transmission output shaft 50 based on inputs received by sensors 110

Figure 2:
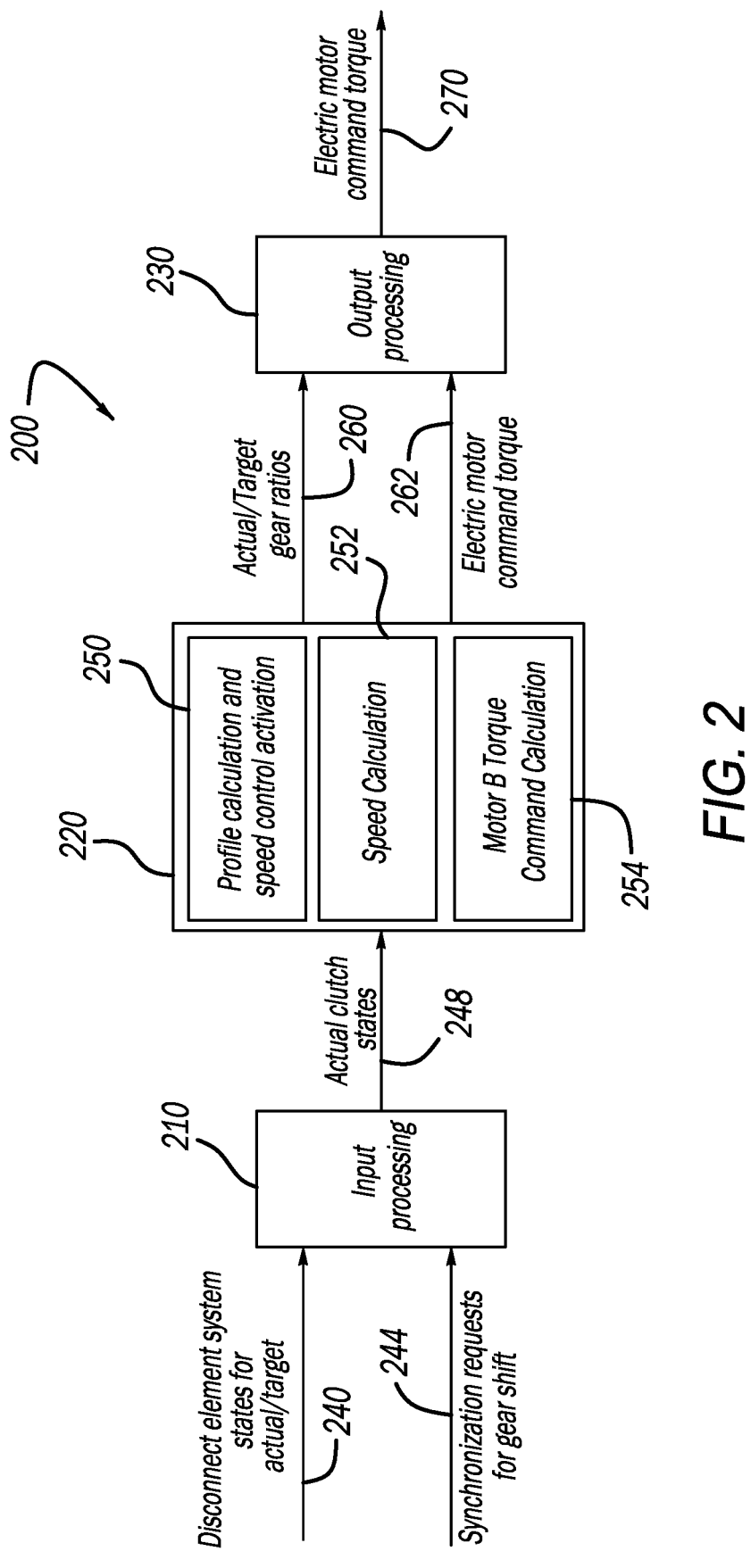
FIG. 2 is a logic flow diagram illustrating various inputs and calculations used in determining an electric motor command torque according to principles of the present application.

With additional reference now to FIG. 2, a logic flow diagram 200 illustrating a control algorithm using various inputs and calculations used by the controller 100 in determining an electric motor command torque sent to the second electric motor 24 will be described according to principles of the present application. The controller 100 generally includes an input processing module 210, a calculation module 220 and an output processing module 230. The input processing module 210 receives various inputs from the sensors 110 including a disconnect element system state signal 240 and a synchronization request for gear shift signal 244. The input processing module 210 outputs an actual clutch state signal 248 to the calculation module 220.

The calculation module 220 generally includes a profile calculation and speed control activation module 250, a speed calculation module 252 and a second electric motor torque command calculation module 254. The profile calculation and speed control activation module 250 calculates a desired speed profile of the second electric motor 24, enables and disables a speed profile depending on system states, calculates a target powertrain gear ratio for the second electric motor 24 and determines a desired state for the internal hybrid control processor (HCP) usage. The speed calculation module 252 calculates an output speed of the transmission output shaft 50 based on target and actual disconnect element 40 status and final drive ratios. The second electric motor torque command calculation module 254 calculates a torque command of the second electric motor 24 based on desired motor speed and motor speed profile for the shift. The calculation module 220 outputs an actual/target gear ratio signal 260 and an electric motor command torque signal 262. The output processing module 230 outputs an electric motor command torque signal 270 based on the actual/target gear ratio signal 260 and an electric motor command torque signal 262.

If the vehicle 10 is moving, the control algorithm 200 targets a transmission output speed profile calculated from the wheel speed and considering all other gear rations between the transmission output shaft 50 and the drive wheels 62 including the final drive ratio. If a low range gear box is used at the transfer case 56, it will include the targeted low range gearbox gear ratio into the calculation. At stand-still, the algorithm 200 will target a small positive speed to rotate at a small speed to unblock the splines of the engage-ment clutch (e.g. at the disconnect element 40). This speed matching allows the low range transfer case to be engaged even at higher vehicle speeds. The target speed profile according to the present disclosure is smooth and ramped. It does not step to the final target.

Figure 3:
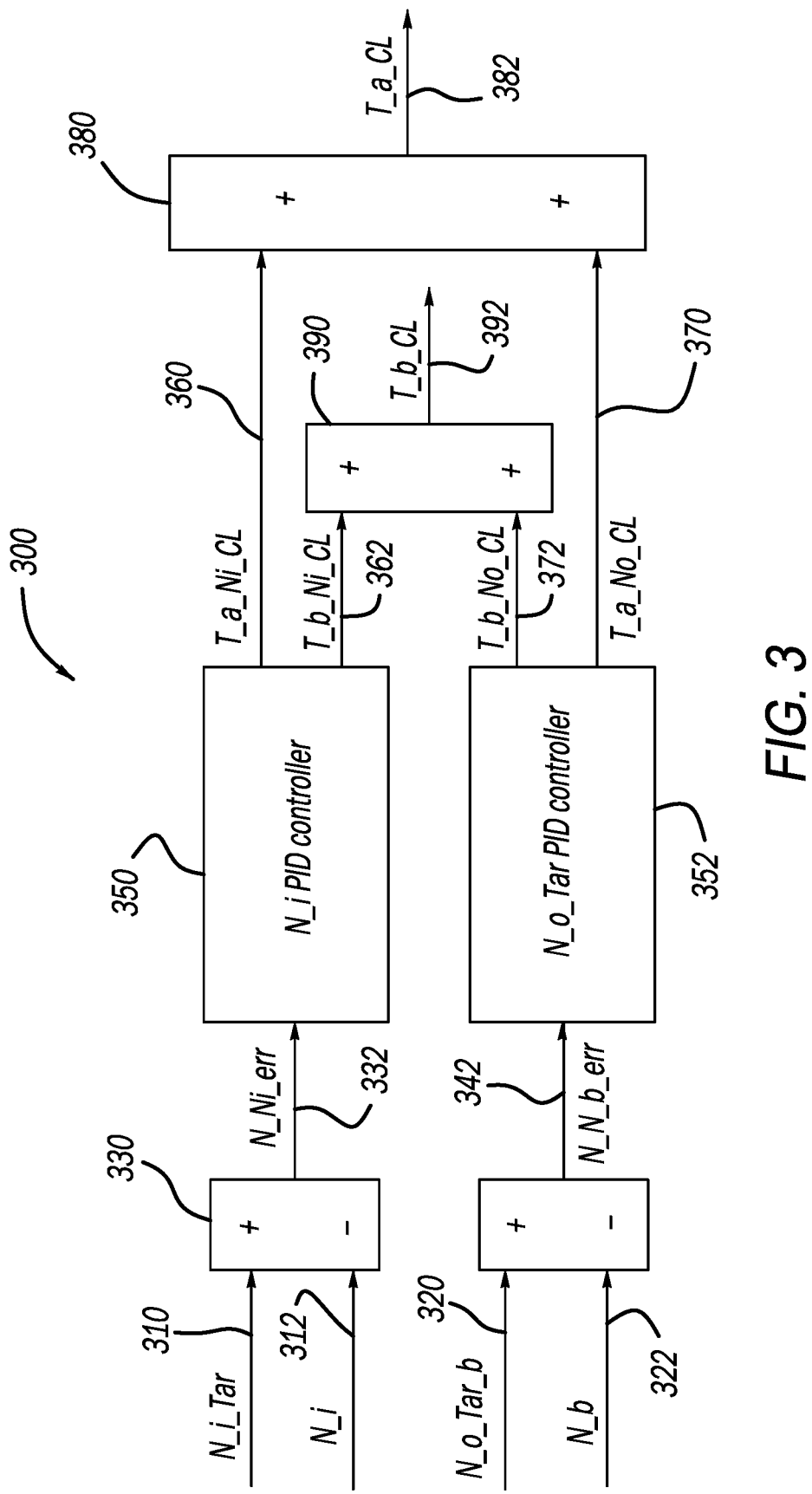
FIG. 3 is an exemplary closed loop control used by the controller in the power split hybrid transmission of FIG. 1.

Turning now to FIG. 3, a closed loop controller torque summation used by the controller 100 is shown and gener-ally identified at reference 300. The closed loop controller torque summation 300 generally receives target engine speed signal 310, an actual engine speed signal 312, a transmission target speed 320, and an actual transmission speed signal 322. The engine speed signal 312 and the transmission speed signals 322 represent an actual measured engine speed and transmission speed (such as at the trans-mission output shaft 50). A first summation block 330 outputs an engine speed error signal 332 to an engine speed target controller 350. In examples, the controller 350 can be a proportional-integral-derivative (PID) controller. A second summation block 340 outputs a transmission output speed error signal 342 to a transmission output speed target con-troller 352. The controller 352 can be a PID controller.

The engine speed target controller 350 outputs an engine speed control torque command signal 360 for the first electric motor 22 and an engine speed torque command signal 362 for the second electric motor 24. The transmis-sion output speed target controller 352 outputs a transmis-sion speed control torque command signal 370 for the first electric motor 20 and a transmission speed control torque command signal 372 for the second electric motor 24. A summation block 380 outputs a torque command signal 382 to the first electric motor 20 based on the engine speed control torque command signal 360 and the transmission speed control torque command signal 370. A summation block 390 outputs a torque command signal 392 to the second electric motor 24 based on the engine speed control torque command signal 362 and the transmission speed control torque command signal 372.

Figure 4:
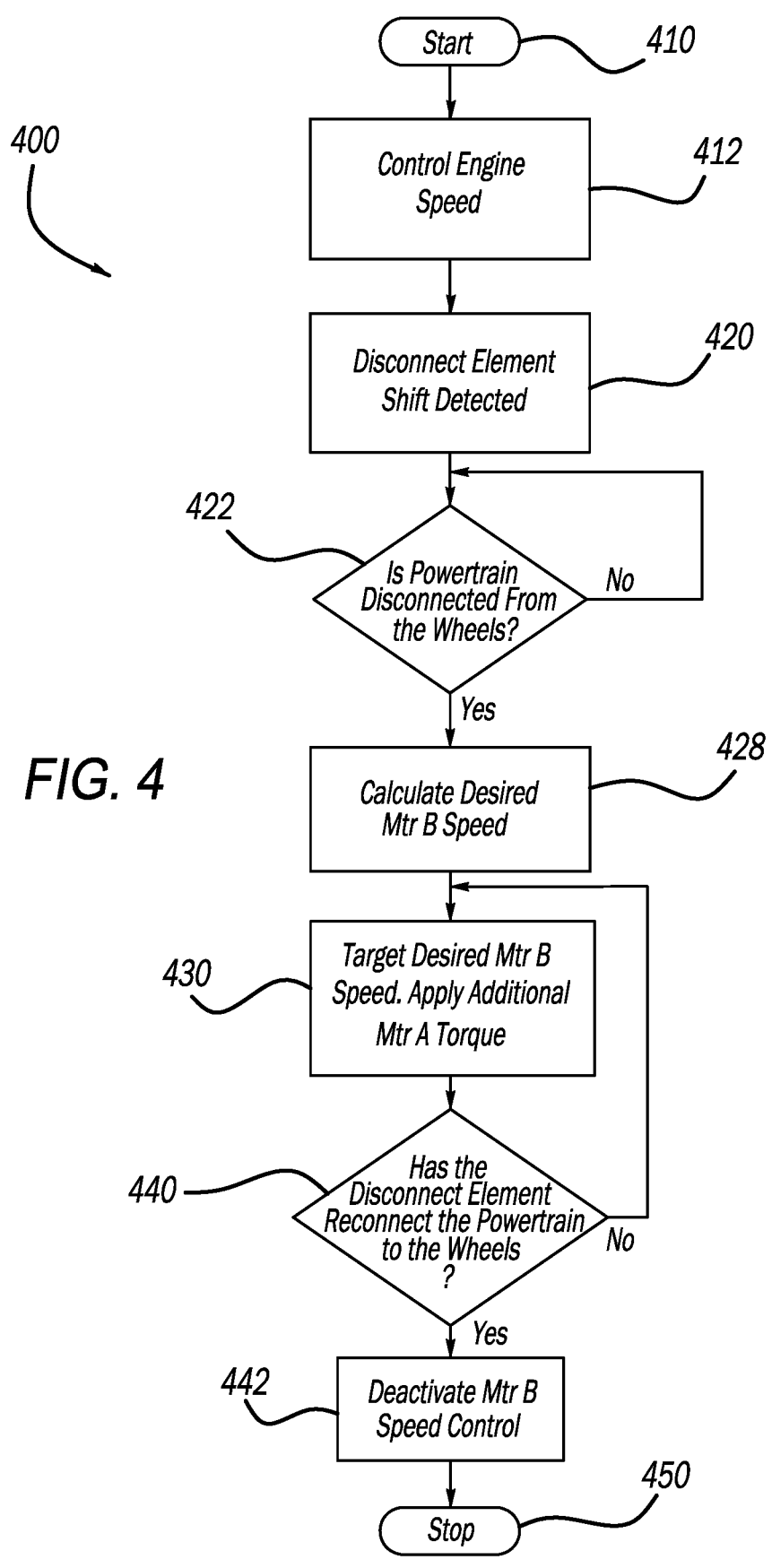
FIG. 4 is an exemplary flow diagram showing steps used to determine and set speeds of the first and second electric motors to achieve a desired transmission output shaft speed during a 4-wheel drive range shift.

With additional reference now to FIG. 4, control method 400 used to determine and set speeds of the first and second electric motors 22, 24 to achieve a desired speed of the transmission output shaft 50 during a 4-wheel drive range shift will be described. The method starts at 410. At 412, the speed of the engine 20 is controlled. In examples, open loop control can command the first and second electric motors 20, 22 depending on commanded engine torque from the vehicle driver and a charge request of the controller 100 to charge the high-voltage battery 94. If the ICE 20 is running, torque from the first and second electric motors 22, 24 are used to control the speed of the ICE 20 in a manner to also have no effective torque at the transmission output shaft 50.

At 420, a disconnect element shift is detected and a target state is changing. At 422, control determines if the pow-ertrain 14 is disconnected to the drive wheels 62. At 428 control calculates a desired speed of the second electric motor 24. The desired speed of the second electric motor 24 can be calculated using wheel speeds (such as using input from sensors 110 and the drive wheels 62) using ratio of the desired disconnect element state, final drive ratio and ratio from the second electric motor 24 to transmission output. The speed ensures speed matching on both sides of the disconnect element 40. Speed control of the second electric motor 24 is enabled.

At 430, control targets a desired speed of the second electric motor 24. The desired speed of the second electric motor 24 is targeted by applying additional closed loop torque to the second electric motor 24. Additional torque is further applied to the first electric motor 22 to avoid a change of speed of the ICE 20 caused by the change of speed of the second electric motor 24. At 440, control determines whether the disconnect element 40 has reconnected to the powertrain 14 to the drive wheels 62. If not, control loops to 430. If the disconnect element 40 has reconnected to the powertrain 14, speed control for the second electric motor 24 is deactivated. Control ends at 450.

It will be appreciated that the term "controller" or "mod-ule" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corre-sponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including dis-closed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A power split hybrid transmission for a vehicle, the power split hybrid transmission system comprising:

an internal combustion engine (ICE) that drives an output shaft that is rotatably coupled to a planetary carrier of a planetary gear set, the planetary gear set further including a sun gear and a ring gear;

a first electric motor that is rotatably coupled to the sun gear of the planetary gear set and that provides a first rotatable input through the ring gear that drives a first ratio counter gear to a transmission output shaft;

a second electric motor that is rotatably coupled to a second ratio counter gear that provides a second rotat-able input to the transmission output shaft;

a disconnect clutch positioned between the transmission output shaft and a transfer case input shaft of a transfer case, the transfer case driving a transfer case output shaft that delivers a drive torque to drive wheels, wherein the disconnect clutch disconnects rotatable motion from the transmission output shaft to the transfer case input shaft such that all of the ICE, first electric motor and second electric motor are disconnected from the transfer case input shaft; and a controller that determines whether the ICE, the first electric motor and the second electric motor are disconnected from the drive wheels and commands torque to the first and second electric motors to cooperatively rotate the transmission output shaft to match a speed of the transfer case output shaft with a speed of the transmission output shaft such that no effective input torque is provided from the transmission output shaft during a range shift of the transfer case.

2. The power split hybrid transmission of claim 1, wherein the controller receives a target engine speed signal and an actual engine speed signal for the ICE and outputs a first engine speed control torque command signal for the first electric motor and a second engine speed control torque command signal for the second electric motors.

3. The power split hybrid transmission of claim 2, wherein the controller receives a transmission output target speed signal and an actual transmission output speed signal for the transmission output shaft and outputs a first transmission control torque command signal for the first electric motor and a second transmission control torque command signal for the second electric motor.

4. The power split hybrid transmission of claim 3, wherein the controller outputs a final first torque command signal to the first electric motor based on the first engine speed control torque command signal and the first transmission output speed signal.

5. The power split hybrid transmission of claim 4, wherein the controller outputs a final second torque command signal to the second electric motor based on the second engine speed control torque command signal and the second transmission output speed signal.

6. The power split hybrid transmission of claim 1, wherein the transfer case is a two speed transfer case providing a high and low 4WD gear ratio.

7. The power split hybrid transmission of claim 1, wherein the first and second electric motors are charged by a high voltage battery system.

8. A method of controlling a power split hybrid transmission for a vehicle, the power split hybrid transmission including an internal combustion engine (ICE) that drives an output shaft that is rotatably coupled to a planetary carrier of a planetary gear set, the planetary gear set further including a sun gear and a ring gear, a first electric motor that is rotatably coupled to the sun gear and that provides a first rotatable input through the ring gear that drives a first ratio counter gear to a transmission output shaft, a second electric motor that is rotatably coupled to a second ratio counter gear that provides a second rotatable input to the transmission output shaft, a disconnect clutch positioned between the transmission output shaft and a transfer case input shaft of a transfer case, the transfer case driving a transfer case output shaft that delivers a drive torque to drive wheels, wherein the disconnect clutch disconnects rotatable motion from the transmission output shaft to the transfer case input shaft, the method comprising:

receiving a target engine speed signal and an actual engine speed signal for the ICE;

outputting a first engine speed control torque command signal for the first electric motor and a second engine speed control torque command signal for the second electric motor based on the target engine speed signal and the actual engine speed signal;

receiving a transmission output target speed signal and an actual transmission output speed signal for a transmission output shaft;

outputting a first transmission control torque command signal for the first electric motor and a second transmission control torque command signal for the second electric motor based on the transmission output target speed signal and the actual transmission output speed signal;

determining whether the ICE, the first electric motor and the second electric motor are disconnected from the drive wheels;

commanding, based on a determination that the ICE, the first electric motor and the second electric motor are disconnected from the drive wheels, a final first torque to the first electric motor based on the first engine speed control torque command signal and the first transmission output speed signal; and commanding, based on a determination that the ICE, the first electric motor and the second electric motor are disconnected from the drive wheels, a final second torque to the second electric motor based on the second engine speed control torque command signal and the second transmission output speed signal, wherein the final first and second torque are determined to match a speed of the transmission output shaft with the transfer case output shaft such that no effective input torque is provided from the transmission output shaft during a range shift of the transfer case.

9. The method of claim 8 wherein the final torque to the second electric motor is further based on wheel speeds of the drive wheels.

10. The method of claim 8 wherein the final second torque to the second electric motor is further based on a final drive ratio of the drive wheels.

11. The method of claim 8 wherein the final second torque to the second electric motor is further based on a ratio between a rotation of the second electric motor and a rotation of the transmission output shaft.

12. The method of claim 8 further comprising:

determining whether an input speed of the second electric motor has altered a speed of the ICE; and commanding an input torque of the first electric motor to counteract the input speed of the second motor to maintain a desired speed of the ICE.

* * * * *